(No Model.) 2 Sheets—Sheet 1.
H. R. WOLFE.
SAW MILL DOG.
No. 395,373. Patented Jan. 1, 1889.
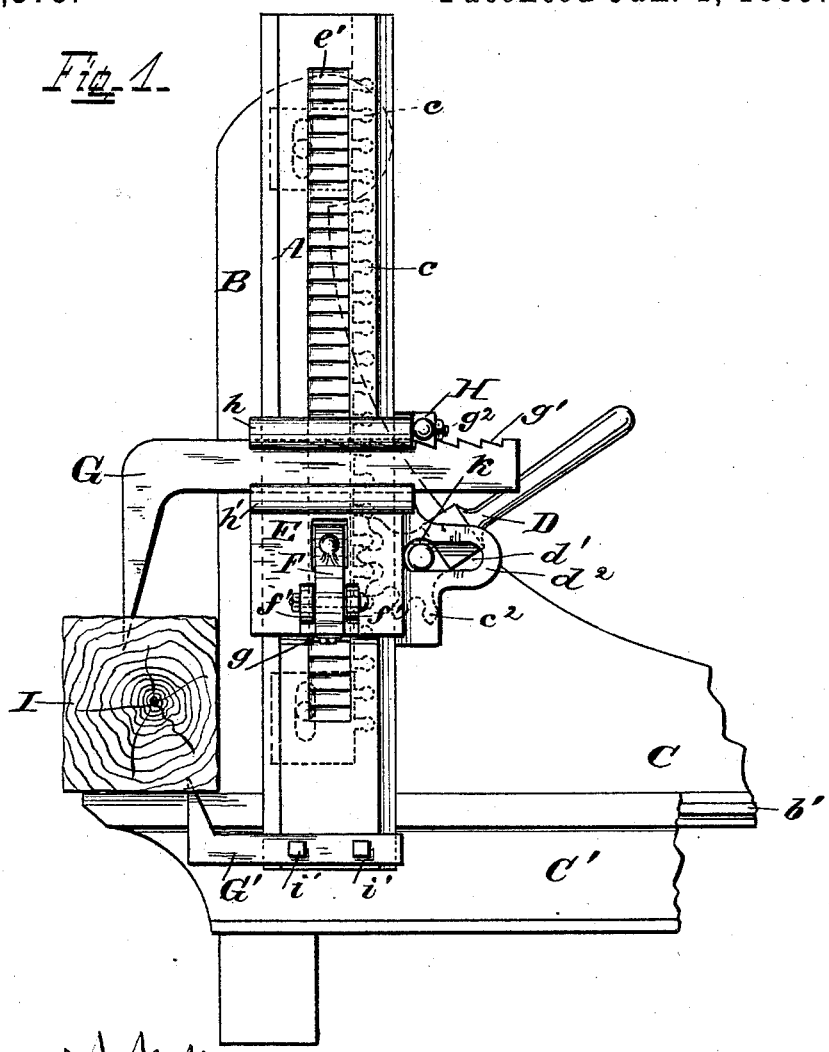
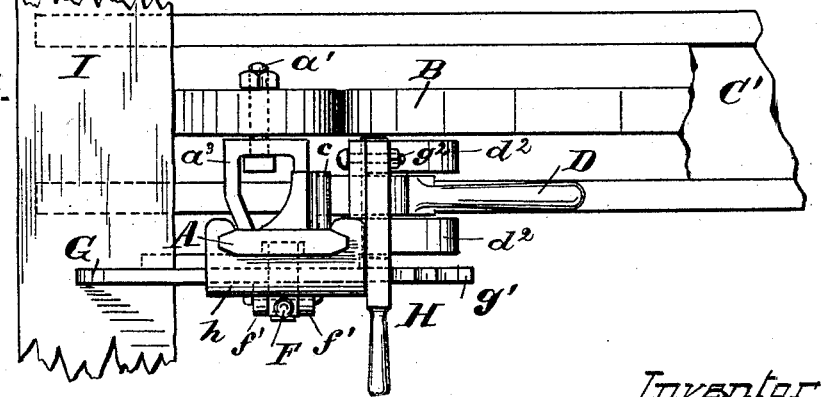
Attest
Carl Spengel
N. C. Whitney
Inventor
Harvey R. Wolfe
by Arthur Stem Atty (No Model.) 2 Sheets—Sheet 2.
H. R. WOLFE.
SAW MILL DOG.
No. 395,373. Patented Jan. 1, 1889.
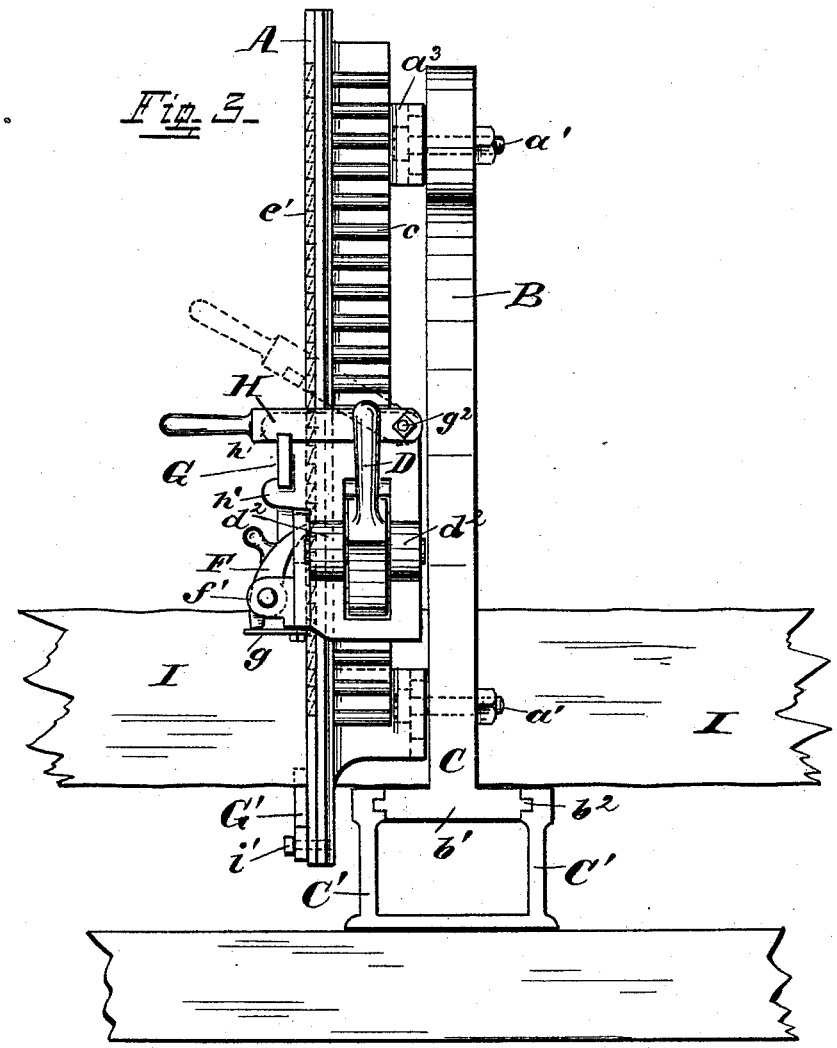
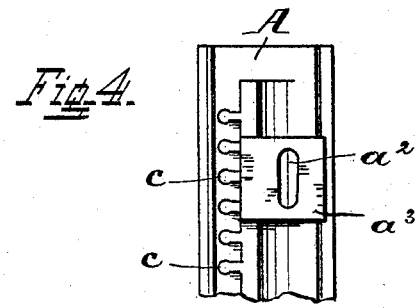
Attest
Carl Spengel
N. E. C. Whitney
Inventor
Harvey R. Wolfe
by Arthur Stem Atty.

United States Patent Office.

HARVEY R. WOLFE, OF LOUISVILLE, KENTUCKY, ASSIGNOR TO JOHN R. BASCOM, AND THE BRENNAN & CO. SOUTH WESTERN AGRICULTURAL WORKS, BOTH OF SAME PLACE.

SAW-MILL DOG.

SPECIFICATION forming part of Letters Patent No. 395,373, dated January 1, 1889.

Application filed December 27, 1887. Serial No. 259,007. (No model.)

*To all whom it may concern:*

Be it known that I, HARVEY R. WOLFE, of the city of Louisville, in the county of Jefferson and State of Kentucky, have invented certain new and useful Improvements in Saw-Mill Dogs, of which the following is a specification.

This invention relates to improvements in saw-mill dogs, the object of the invention being to provide a simple, durable, and efficient apparatus, the parts of which are so constructed and arranged that the two timber-grasping dogs may be quickly and easily forced into or withdrawn from the timber or log simultaneously at one operation and by one lever; also, to provide a simple device, substantially as hereinafter described, to lock at any desired point the sliding head, which carries one of the timber-grasping dogs, and hold the same in adjusted position with relation to slide-bar, which carries the other or fellow dog, so as to permit great pressure to be applied through the medium of the main lever upon the dogs without the possibility of slipping or displacement; also, to provide a supplemental locking device in connection with the journal of the operating-lever to hold the sliding head in any position upon the slide-bar when the dogs are withdrawn from the timber, or when raised or lowered to permit the entrance of timber between the dogs of greater or less diameter; and, also, to so construct the rack-teeth upon the slide-bar and the teeth of the operating-lever that they will closely mesh in all positions of the lever, which, as will be apparent, obviates slipping when pressure is applied to force the dogs into the timber, all of which will be hereinafter fully explained.

With these objects in view the invention consists, essentially, in certain details of construction and in the combination and arrangement of the several parts of the saw-mill dog, as will be hereinafter described, and set forth in the claims.

In the accompanying drawings, Figure 1, Sheet 1, represents in side elevation a saw-mill dog constructed in accordance with this invention, parts being shown by dotted lines; Fig. 2, Sheet 1, a plan view of the same; Fig. 3, Sheet 2, a rear view of the same, parts and positions of parts being shown in dotted lines; and Fig. 4, Sheet 2, a detail in rear elevation of a portion of slide-bar, showing the elongated guiding-slot therein.

Referring to the drawings, A represents the slide-bar, preferably constructed of cast metal and movably secured at or near its upper and lower ends to the carriage or knee B C (B representing the upright and C the lower portion of the knee) by means of gib-bolts $a'$, extended through elongated slots $a^2$, formed in the rearward projections, $a^3$, of the said slide A, and through the upright B, as clearly shown in the drawings, the upright or head-block B having at its lower end a cross-head, $b'$, which moves in grooves or ways $b^2$, formed in the head-block supports C', as shown clearly in Fig. 3, Sheet 2.

Formed upon the rear face of the slide-bar A and preferably integral therewith are a series of cylindrically headed (or faced) teeth, $c$, which form a rack nearly the entire length of the slide-bar, into and with which mesh similarly-constructed teeth $c^2$ upon a mutilated cog-lever, D, which lever is movably and adjustably journaled in an elongated journal-bearing, $d'$, formed in rearwardly-projecting gears $d^2$ upon the sliding head E, which sliding head engages and travels upon the upright slide-bar A, which slide-bar, as before stated, is permitted to move upward and downward a short distance upon the gib-bolts $a'$.

The side face of the slide-bar A is provided with (or has formed integral thereupon) a series of downwardly-projecting ratchet-teeth, $e'$, which ratchet-teeth are engaged by a pawl, F, pivoted between ears $f'$ upon the side of the sliding head E, the said sliding head having an opening therein (not clearly shown) to permit the free movement of the pawl in its engagement and disengagement with the ratchet-teeth.

Bolted or otherwise secured to the lower face of the sliding head E is a flat sheet-metal spring, $g$, the free end of which abuts against the lower projected end of the pawl F, and by its elastic pressure insures contact between the pawl and ratchet-teeth, and also when the pawl is thrown back out of engagement with the ratchet-teeth retains it in a disengaged position.

At the upper end of the sliding head are two lateral projections, $h\ h'$, having grooves or ways $h^2$ formed therein for the reception and guidance of the upper timber-grasping dog, G, which dog is notched at its upper rear edge, as shown at $g'$, Fig. 1, Sheet 1, to receive the lower edge of a locking-lever, H, pivoted at its rear end to the upper side of the sliding head E, as shown at $g^2$, which lever is designed to hold the dog G from longitudinal movement when in engagement with the timber I, as such movement might occur on account of the vibrations of the timber while being sawed were no lock provided.

The fellow or lower timber-grasping dog, $G'$, is rigidly secured by means of bolts $i'$ to the lower end of the upright slide-bar A, and is permitted to move upward and downward therewith.

As will be noticed by reference to the drawings, the elongated slots $d'$, formed in the rearwardly-projecting ears of the sliding head E, and which form the journal for the trunnions or shaft of the operating cogged lever D, are enlarged at their forward ends, as shown at $k$, which enlargement is in the form of a semicircle, the lower portion or edge of the said semicircle being aligned with the lower edge of the main portion of the elongated slot or journal-bearing and the upper portion being somewhat above said slot. The object of so enlarging the forward end of the journal-bearing is to permit the trunnions or shaft of the operating-lever to automatically seat itself in and rest against the upper edge of said enlarged portion of the slot when the pawl F is disengaged and during adjustment of the sliding head, the weight or specific gravity of the sliding head tending to lower the handle of the lever D, which throws the shaft or trunnions upward, thus locking it and preventing slipping, which is a great desideratum.

On account of the elongation of the journal-bearing for the lever D, the said lever may be thrown entirely out of engagement with the rack-teeth of the sliding bar A, which is very desirable when making quick and long adjustments.

By constructing the rack-teeth upon the slide-bar A and the teeth upon the mutilated cogged lever D, as shown and described, it will be seen that one tooth upon the cogged lever never leaves the tooth upon the slide-bar until the next tooth is fully in engagement with the next corresponding tooth upon the slide-bar, which entirely obviates slipping, as the teeth closely mesh at all times.

The operation of this improved saw-mill dog will be readily apparent to those skilled in the art to which it appertains, and therefore need not be entered into.

I claim—

1. In a saw-mill dog, the combination, with an upright slide-bar having rack-teeth formed upon one face and provided with a timber-grasping dog at its lower end, of a sliding head engaging said slide-bar and provided with two grooved projections, a notched dog adjustable in said projections, a locking-lever pivoted to the sliding head and engaging with one of the notches in the adjustable dog, and a cog-lever pivoted to the sliding head, the cogs on said lever engaging the rack-teeth on the slide-bar to move the latter up and down, substantially as described.

2. The combination, with the slide-bar having on its rear face a series of rack-teeth and on one side face a series of ratchet-teeth and provided with a dog, of the sliding head carrying a dog, a cogged lever loosely journaled in said head to engage with the rack-teeth on the slide-bar, and a spring-pressed pawl pivoted on the sliding head to engage with the ratchet-teeth on the slide-bar, for the purposes set forth.

3. The combination, with the slide-bar having on its rear face a series of rack-teeth and on one side face a series of ratchet-teeth and provided with a dog, of the sliding head carrying a dog and having slotted ears, the upper sides of the slots in the ears being enlarged at their forward ends, a pawl pivoted on the sliding head to engage with the ratchet-teeth on the slide-bar, and a cogged lever loosely journaled in said ears to engage with the rack-teeth on the slide-bar, for the purposes set forth.

4. The combination, with the slide-bar having cylindrically-formed teeth on its rear face, provided with a dog, of the sliding head carrying a dog and the operating-lever loosely journaled in the head, the said lever having cylindrically-faced cog-teeth at its forward end to mesh with the teeth on the slide-bar, substantially as described, and for the purpose stated.

5. A saw-mill dog comprising the following essential elements: the upright or knee B, the slide-bar A, adjustably secured thereto and having the cylindrically-faced teeth at its rear and the ratchet-teeth upon its side, the sliding head E, having the mutilated cogged lever D to engage the teeth of the slide-bar A, and having the enlarged ended elongated bearing $d'$ for the journal of the lever D, the locking mechanism consisting of the pawl F, pivoted to the sliding head, and the spring $g$, to hold said pawl into engagement with the ratchet-teeth of the slide-bar, said slide-bar carrying one of the timber-grasping dogs and the sliding head the other, substantially as shown and described.

6. The combination, in a saw-mill dog, of the slide-bar A, having the cylindrical rack-teeth $c$ and ratchet-teeth $e'$, the slide-bar carrying one of the dogs $G'$, the sliding head E, having the pivoted lever D to engage the teeth of the slide-bar, the spring-pawl-locking device to engage the ratchet-teeth, the notched dog G, adjustably seated in grooves in the sliding head, and the pivoted locking-lever H, to engage the notches of said dog and hold it against displacement, all substantially as shown and described.

In witness whereof I have hereunto set my hand, at Louisville, Kentucky, this 12th day of December, A. D. 1887.

HARVEY R. WOLFE.

Witnesses:
W. I. KNAPP,
H. E. CHRISTMAN.